W. W. PRIMM.
Reciprocating Churn-Dash.

No. 199,742. Patented Jan. 29, 1878.

WITNESSES:

INVENTOR:
W. W. Primm
BY
ATTORNEYS.

UNITED STATES PATENT OFFICE.

WILLIAM W. PRIMM, OF MURPHYSBOROUGH, ILLINOIS, ASSIGNOR TO HIMSELF AND ROBERT W. HAMILTON, OF SAME PLACE.

IMPROVEMENT IN RECIPROCATING CHURN-DASHES.

Specification forming part of Letters Patent No. 199,742, dated January 29, 1878; application filed December 11, 1877.

*To all whom it may concern:*

Figure 1:
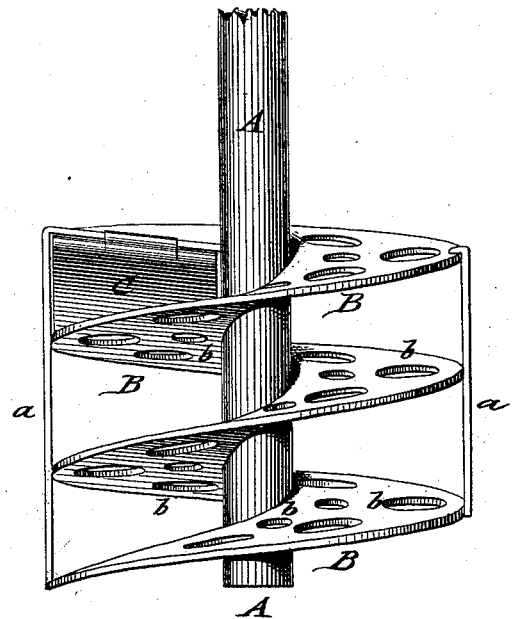
Figure 2:
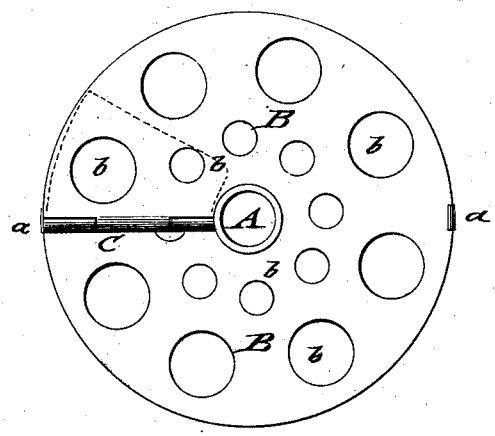

Be it known that I, WILLIAM W. PRIMM, of Murphysborough, in the county of Jackson and State of Illinois, have invented a new and Improved Churn-Dash, of which the following is a specification:

In the accompanying drawing, Figure 1 represents a side view, and Fig. 2 a top view, of my improved churn-dash.

Similar letters of reference indicate corresponding parts.

The invention has reference to an improved churn-dash for breaking up the cream in the manufacture of butter in quick and effective manner; and the invention consists of a churn having a hollow center staff and spiral perforated plate, with a radial gate at the upper edge of the spiral plate.

Referring to the drawing, A represents the hollow center staff or rod, and B the perforated dash-plate, that extends in several spiral convolutions around the staff, being stiffened at one or more points by vertical connecting-rods or stays $a$. The perforations $b$ of the spiral dash-plate are of different size, so as to break up the cream into bodies of different thickness. To the upper edge of the spiral dash-plate B is hinged radially to the staff A a drop-gate, C, that rests by its lower edge on the convolution next below, and closes the spiral dash-plate during the downward motion of the dash by the pressure of the upwardly-crowded cream, so as to force the same violently through the perforations of the dash-plate. During the upward motion of the dash the gate is lifted up by the downward rushing of the cream, so as not to obstruct the passage of the cream.

The hinged gate may, in some cases, be left off, if desired, though it assists in effective manner to accelerate the process of separating the butter from the cream.

The dash is used in the customary reciprocating manner, the downward motion causing the cream to pass through the perforations of the dash-plate and to start it in a circular motion around the center staff. As it circles around the staff the cream gravitates to the circumference of the churn, and leaves a hollow space next to the staff, which draws in the air, so that the milk, when the dash is fully immersed, acquires a considerable velocity, and rushes with great force through the outside perforations and between the dash and churn. When the cream leaves the top of the dash it is pressed against the sides of the churn with such force as to rebound from the same and fall around the center staff, inclosing the air that has been drawn in by the motion of the cream during the downward motion of the dash. The upward motion of the dash does not allow this air to escape, but leaves it at the bottom of the churn, to be acted upon by the milk that rushes down through the perforations of the dash, so as to divide the air into smaller particles or bubbles, and mix thereby thoroughly with the milk. This furnishes the necessary oxygen to the fluid for accelerating the separation of the butter, while the continuous breaking up of the milk by the dasher-plate causes mechanically the separation of the butter-globules from the cream, and thereby the production of a superior butter in a comparatively shorter time than with other dashers in use.

Having thus described my invention, I claim as new and desire to secure by Letters Patent—

A churn-dash made of a hollow center staff or rod, and of a perforated dash-plate, extending spirally around the staff, and having a hinged radial gate at the upper edge, substantially as described.

WILLIAM WESLEY PRIMM.

Witnesses:
 MILES W. SHAW,
 JOSEPH M. HAMILTON.